(12) United States Patent
Ramachandran et al.

(10) Patent No.: US 8,799,255 B2
(45) Date of Patent: Aug. 5, 2014

(54) BUTTON-ACTIVATED CONTEXTUAL SEARCH

(75) Inventors: Deepa Ramachandran, Mountain View, CA (US); Stephen M. Yolleck, Sunnyvale, CA (US); William J. Pardi, Edgewood, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 12/972,415

(22) Filed: Dec. 17, 2010

(65) Prior Publication Data

US 2012/0158688 A1     Jun. 21, 2012

(51) Int. Cl.
    *G06F 17/30* (2006.01)
(52) U.S. Cl.
    USPC .................. 707/706; 707/E17.108; 345/163
(58) Field of Classification Search
    None
    See application file for complete search history.

(56) References Cited

U.S. PATENT DOCUMENTS

| | | | |
|---|---|---|---|
| 6,785,670 B1 | 8/2004 | Chiang et al. | |
| 7,194,460 B2 | 3/2007 | Komamura | |
| 2003/0028513 A1 | 2/2003 | Pawar | |
| 2004/0139106 A1 | 7/2004 | Bachman et al. | |
| 2005/0246320 A1 | 11/2005 | Benysh et al. | |
| 2006/0167857 A1 | 7/2006 | Kraft et al. | |
| 2007/0100803 A1 | 5/2007 | Cava | |
| 2008/0062130 A1 | 3/2008 | Lin | |
| 2009/0132969 A1* | 5/2009 | Mayer | 715/862 |
| 2009/0240658 A1 | 9/2009 | Chang | |
| 2009/0248679 A1* | 10/2009 | Kikuchi et al. | 707/5 |
| 2010/0017366 A1 | 1/2010 | Robertson et al. | |

FOREIGN PATENT DOCUMENTS

| | | |
|---|---|---|
| CN | 101243449 A | 8/2008 |
| CN | 101385025 A | 3/2009 |
| KR | 1020100007695 A | 1/2010 |
| WO | 2007066987 A1 | 6/2007 |

OTHER PUBLICATIONS

"International Search Report", Mailed Date: Sep. 3, 2012, Application No. PCT/US2011/064683, Filed Date: Dec. 13, 2011, pp. 9.
Larryb., "Contextual Search API from Yahoo—Keyword Extraction for free", Retrieved at << http://www.learningapi.com/blog/archives/000096.html >>, Jan. 31, 2006, pp. 3.
Office Action CN Patent Application No. 201110423035.2 dated Dec. 3, 2013, Filed: Dec. 16, 2011.

* cited by examiner

*Primary Examiner* — Anteneh Girma
(74) *Attorney, Agent, or Firm* — Dave Ream; Jim Ross; Micky Minhas

(57) ABSTRACT

This patent application relates to button-activated contextual search techniques for providing contextually relevant search functionality on a display. The single button can be a search button on a pointing device (e.g., a computer mouse device, touch pad, track ball device, etc.) configured to move a pointer on the display. The pointer can be moved to a location that is on or near an entity on the display, allowing a search to be enabled and/or performed for that entity when the search button is activated (e.g., with a single user click). Furthermore, the search functionality can be based on one or more automatically generated search terms for the entity, and thus be contextually relevant to the entity.

23 Claims, 10 Drawing Sheets

BUTTON-ACTIVATED CONTEXTUAL SEARCH

BACKGROUND

Typically, performing a search using a search engine requires the use of a browser application. If a browser application is not open, a user will likely have to interrupt their current activities and launch the browser application in order to perform the search. This can be inconvenient, disruptive to the user's workflow, and can substantially limit the contextual information that may be used for the search. Furthermore, in some cases copying/pasting information to use for relevant searching may be difficult or even impossible. Further still, the user might wish to initiate a search associated with an entity outside of a traditional application, such as a search based on a particular file or control/feature. Traditional approaches do not provide a convenient and effective way for the user to initiate such a search.

SUMMARY

Button-activated contextual search techniques are described for providing contextually relevant search functionality on a display. The button can be a search button on a pointing device (e.g., a computer mouse device, touch pad, track ball device, etc.) configured to move a pointer on the display. The pointer can be moved to a location that is proximate (i.e. on or near) an entity on the display, allowing a search to be enabled and/or performed for that entity when the search button is activated. Furthermore, the search functionality can be based on one or more automatically generated search terms for the entity, and thus be contextually relevant to the entity.

In at least one embodiment, the search button can be a dedicated search button integrated on the pointing device. Alternatively or additionally, a non-dedicated button on the pointing device can be programmatically configured as the search button. In either case, contextually relevant search functionality can be provided on the display when the search button is activated. The search button can be activated in any suitable way, such as by a user clicking the search button (e.g., by a single click of the search button) for instance.

In at least one embodiment, the search functionality can be provided by automatically presenting a flyout window on the display that allows the user to initiate a search using the generated search term(s). Alternatively, the search functionality can be provided by automatically initiating the search using the generated search term(s), and then presenting the search results in a flyout window.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements.

DETAILED DESCRIPTION

Overview

Figure 1:
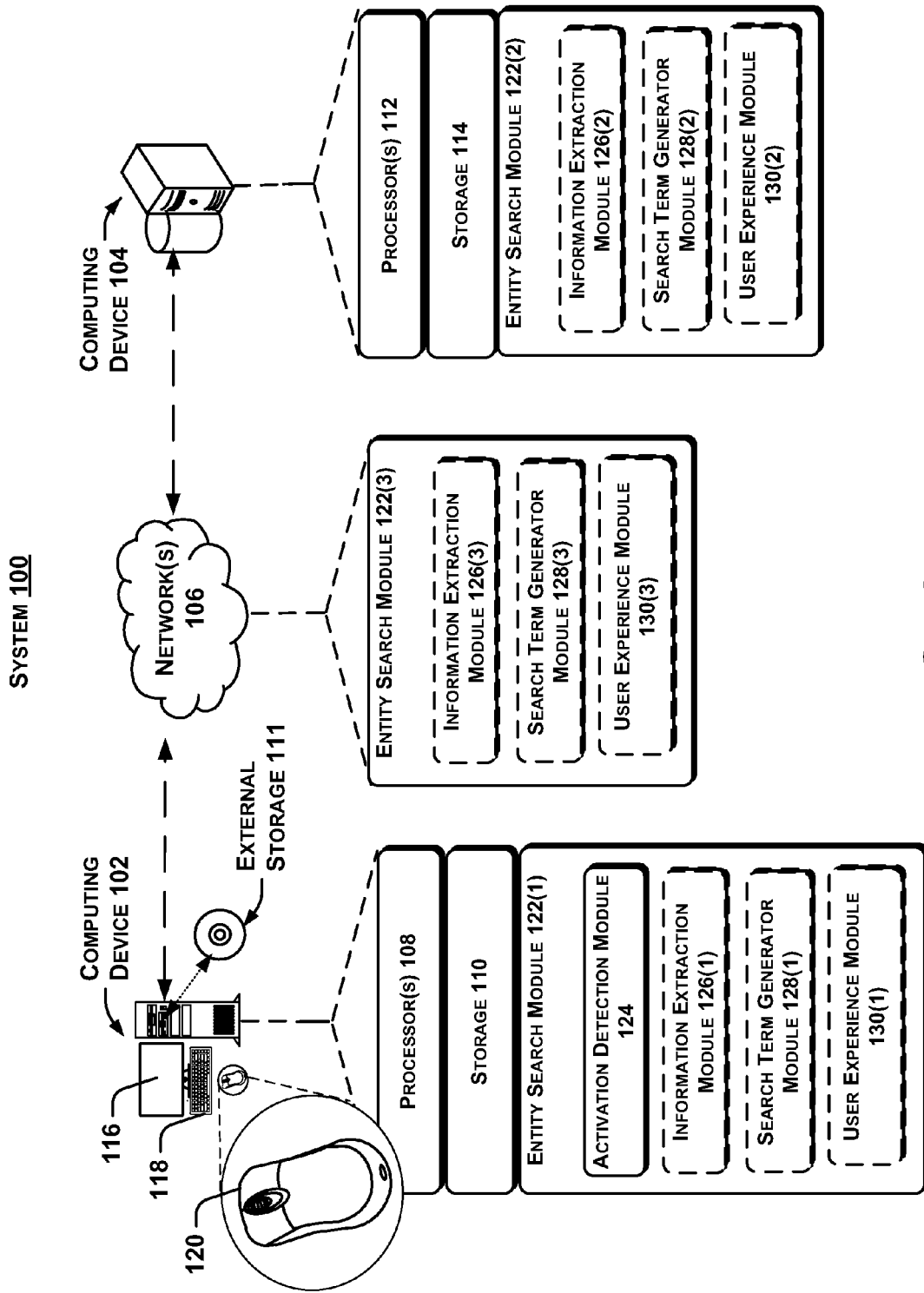
FIG. 1 illustrates an example system in which the described search techniques can be implemented, in accordance with at least one embodiment.

Button-activated contextual search techniques are described for providing contextually relevant search functionality on a display associated with a computing device. The button can be a search button on a pointing device (e.g., a computer mouse device (i.e., mouse), touch pad, track ball device, trackpoint device, etc.) configured to move a pointer on the display. The pointer can be moved to a location that is proximate (i.e. on or near) an entity on the display, allowing a search to be enabled and/or performed for that entity when the search button is activated. Furthermore, the search functionality can be based on one or more automatically generated search terms (e.g., a keyword(s)) for that entity, and thus be associated with, and contextually relevant to, that entity.

The entity may be any type of displayed entity, and need not be associated with a hyperlink or other type of navigable reference pointing to (e.g., specifying with a uniform resource identifier) a target. Furthermore, the entity need not be presented in a browser application, and instead may be presented in association with any type of application or other type of displayable functionality. Thus, the contextually relevant search functionality can be provided for any entity irrespective of what application or program (if any) is open.

In at least one embodiment, the search button can be a dedicated search button integrated on the pointing device. Alternatively or additionally, a non-dedicated button on the pointing device can be programmatically configured as the search button (to be used alone or in combination with another device element such as a keyboard key). The search button can be configured to be activated in any suitable way, such as in response to a single depression, a release, a single click (depression and release), a tap, or other type of manipulation by the user. By virtue of being configured with such a search button, for discussion purposes the pointing device can be referred to as a search button enabled (SBE) pointing device.

To facilitate providing the contextually relevant search functionality, in at least one embodiment an entity search module can be implemented at least in part by the computing device. The entity search module can be configured to detect the activation of the search button and, in response, identify the entity, gather information about the entity, generate the search term(s), and/or provide the contextually relevant search functionality on the display (e.g., in a flyout window).

In at least one embodiment, the contextually relevant search functionality can be provided by automatically presenting a flyout window on the display that allows the user to initiate a search using the generated search term(s). Alternatively, the search functionality can be provided by automatically initiating the search using the generated search term(s), and then presenting the search results in a flyout window.

Multiple and varied implementations are described below. Generally, any of the features/functions described with reference to the figures can be implemented using software, hardware, firmware (e.g., fixed logic circuitry), manual processing, or any combination thereof. The terms "module" and/or "component" as used herein may generally represent software, hardware, firmware, or any combination thereof. For instance, the term "module" can represent software code and/or other types of instructions that perform specified tasks when executed on a computing device or devices.

Generally, the illustrated separation of modules or components and functionality into distinct units may reflect an actual physical grouping and allocation of such software, firmware, and/or hardware. Alternatively or additionally, this illustrated separation can correspond to a conceptual allocation of different tasks to the software, firmware, and/or hardware. Furthermore, it is to be appreciated and understood that the illustrated modules and/or components and functionality described herein can be located at a single site (e.g., as implemented by a computing device), or can be distributed over multiple locations (e.g., as implemented over multiple computing devices).

Example System

FIG. 1 illustrates an example system in which the described button-activated contextual search techniques may be implemented, in accordance with some embodiments. In this example, the system 100 includes multiple computing devices, represented here as computing devices 102 and 104. These computing devices can function in a stand-alone or cooperative manner to implement the described techniques. Furthermore, in this example, the computing devices 102 and 104 can exchange data over one or more network(s) 106. Additionally, the computing device 102 and/or computing device 104 can exchange data with one or more other types of devices via network(s) 106 (e.g., via a cloud). Without limitation, the network(s) 106 can include one or more local area networks (LANs), wide area networks (WANs), the Internet, and the like.

Here, each of the computing devices 102 and 104 can include a processor(s) and storage. More particularly, here the computing device 102 includes processor(s) 108 and storage 110. Similarly, the computing device 104 includes processor(s) 112 and storage 114. The processor(s) 108 and 112 can execute data in the form of computer-readable instructions to provide the functionality described herein. Data, such as computer-readable instructions can be stored on the storage 110 and/or 114. The storage 110 and/or 114 can include one or more of volatile or non-volatile memory, hard drives, optical storage devices (e.g., CDs, DVDs etc.), among others.

The devices 102 and 104 can also be configured to receive and/or generate data in the form of computer-readable instructions from one or more other storages, such as external storage 111 shown here. Examples of external storage can include optical storage devices (e.g., CDs, DVDs etc.) and flash storage devices (e.g., memory sticks or memory cards), among others. The computing devices may also receive data in the form of computer-readable instructions over the network(s) 106 that is then stored on the computing device(s) for execution by its processor(s).

Recall from above that in accordance with the described techniques, a search button on an SBE pointing device can be configured to cause contextually relevant search functionality to be provided on the display of a corresponding computing device when the search button is activated. Accordingly, here the computing device 102 is shown as including and/or being associated with a display 116. The computing device 102 is also shown as interfacing with (and thus being associated with) input/output devices, namely a keyboard device 118 and an SBE pointing device 120.

As will be appreciated and understood by those skilled in the art, a pointing device (e.g., the SBE pointing device 120) may be thought of as a type of human interface device (HID) having one or more components configured to allow a user to control (e.g., position, move, activate, etc.) a corresponding pointer on a display (such as the display 116) by manipulating (e.g., moving) the pointing device.

For example, the user may manipulate the SBE pointing device 120, thus causing a corresponding movement of the pointing device on the display 116. As used herein, the term "pointer" can thus mean an icon or any other type of feature presented on a display that may be moved by the manipulation of a corresponding pointing device.

Also recall that to facilitate providing search functionality, an entity search module can be implemented at least in part by a computing device. Accordingly, here the computing device 102 is shown as implementing at least part of an entity search module 122. As will be described in further detail below, the entity search module 122, in turn, can include an activation detection module 124, an information extraction module 126, a search term generator module 128, and a user experience module 130.

In some embodiments, the computing device 102 may function in a stand-alone configuration such that all of the entity search module 122 is implemented by the computing device 102. In other words, in such embodiments the activation detection module 124, information extraction module 126, search term generator module 128, and user experience module 130 may all be implemented by resources provided by the computing device 102.

In other embodiments, some of the entity search module 122 may be implemented using other resources provided by the computing device 104 and/or one or more other computing devices. For example, all or part of the information extraction module 126, search term generator module 128, and/or user experience module 130 may be implemented by cloud-based resources. The cloud-based resources may be provided by any number of known and/or unknown distributed computing devices connected to the computing device 102 via the network(s) 106 (e.g., via the cloud). Results of the processing may then be sent to the computing device 102.

The term "computing device" as used herein can mean any type of device or devices having some amount of processing capability. Examples of computing devices can include traditional computing devices, such as personal computers (desktop, portable laptop, etc.), cell phones, smart phones, personal digital assistants, or any of a myriad of ever-evolving or yet to be developed types of computing devices.

Entity Search Module

In operation, in at least one embodiment the entity search module 122 can be configured (e.g., by the user, a developer, etc.) to provide the contextually relevant search functionality in response to a search button on the SBE pointing device 120 being activated. In this way, the user may be provided with search functionality, such as an enabled search or search results, simply by activating the search button.

Continuing, the entity search module 122 can provide the contextually relevant search functionality irrespective of any particular type of application or program. Therefore, the user does not need to open a browser application and manually type in search terms in order to access the search functionality.

As noted above, the entity search module 122 can include the activation detection module 124, the information extraction module 126, the search term generator module 128, and the user experience module 130. In at least one embodiment, some or all of one or more of these modules can be manifest as a mouse driver or drivers associated with the SBE pointing device 120.

In operation, the activation detection module 124 can be configured to detect the activation of the search button. For example, in at least one embodiment, the activation detection module 124 may include interface software (e.g., all or part of a mouse driver(s)) that can receive the activation. For example, a single depression, release, click (depression and release), tap or tapping, or other manipulation of the search button by the user may cause an activation signal to be sent to the activation detection module 124. The activation detection module 124 may receive the activation signal and, in response, notify one or more of the other modules of the entity search module 122.

In response to the activation being detected, the information extraction module 126 can be configured to identify an entity or entities corresponding to the activation. For the sake of clarity, the term "entity" as used herein may refer to one entity, or to multiple entities.

As explained above, the identified entity need not be associated with a navigable reference (e.g., hyperlink) pointing to a target, and can instead be any type of entity presented on the display 116. For example, without limitation, an identified entity might be text, a control (e.g., an application control button, operating system control, etc.), a ribbon, file (e.g., image, music file, movie file, executable file, etc.), or a displayed window itself.

In at least one embodiment, the location of the pointer on the display 116 at the time of the activation can be used to identify the entity. More particularly, an entity presented proximate (i.e., at or near) the pointer's location might be identified as the entity corresponding to that activation. For example. in at least one embodiment, an entity at the highest z-order of the pointer may be identified.

The information extraction module 126 can also be configured to obtain (e.g., extract) contextual information about the identified entity and/or the computing experience associated with the activation. This contextual information may be relevant to the entity because it describes the entity itself and/or the computing environment when the user activated the search button.

Any type and amount of contextually relevant information may be obtained. For example, without limitation, this information might include the entity's name and type (e.g., multimedia file, text, control button, etc.), metadata accompanying the entity (e.g., a music file might include lyrics in text), the application or other program type in which the entity is displayed (e.g., a word processing application, spreadsheet application, operating system control feature, etc.), the operating system type and version implemented by the computing device 102, the computing device's hardware configuration profile, the date and/or time of the activation, the identity of the logged-in user causing the activation, and/or text or other data selected by the user at the time of the activation, etc. All of this information may be contextually relevant to the identified entity and/or the computing experience.

As a practical example, consider a user that utilizes the SBE pointing device 120 to position the pointer over a music file (e.g., .mp3 file) on the display 116. The user then activates the search button (e.g., by clicking it once). The activation detection module 124 can receive the activation and notify the information extraction module 126. By virtue of the music file and pointing device being in the same or similar location on the display 116, the information extraction module 126 can identify the music file as an entity corresponding to the activation.

The information extraction module can then obtain contextual information about the music file, and about the computing experience associated with the activation. For example, the information extraction module 126 may process the music file to extract metadata about the file, such as: the name of a song associated with file, the file type (e.g., mp3, etc.), the artist associated with the song, lyrics, a link to additional songs, and the like. Alternatively or additionally, the information extraction module 126 may gather information about the computing experience associated with the activation. This information might include, for example, the user's login identification and profile information about the user (e.g., the user's age, preferences, etc.), the application causing the entity to be displayed, the time and/or date when the activation occurred, etc.

As another practical example, consider a user that utilizes the SBE pointing device 120 to position the pointer over an application control (e.g., an operating system control or custom application control) presented on the display 116. The information extraction module 126 may obtain the control's text and/or accessibility information for the control. In addition, other contextual information about the computing experience, such as: the user's login identification, operating system feature or application presenting the control, etc. might also be obtained.

Once the information extraction module 126 has identified the entity and obtained the contextual information, the search term generator module 128 can then select at least a portion of this information to be used to generate one or more search terms. The search term generator module 128 can make this selection based on certain criteria. For example, in at least one embodiment the search term generator module 128 can filter out at least some of the contextual information (based at least in part on the criteria) that is not to be used for generating the search term(s).

Any suitable criteria can be used to select the contextual information to be used. For example, the criteria might include logic (heuristic and/or non-heuristic logic) intended to categorize and/or rank individual contextual information portions based on their attributed relevance to the user. This could include identifying the contextual information as a street address, a stock symbol, a package tracking number, etc. This could also include identifying the spoken language in which the text is rendered. As another example, the criteria might include standards and/or policies intended to limit the amount of information that is to be identified and/or remove sensitive information compromising the user's desired privacy/anonymity.

Once the contextual information has been selected, the selected contextual information can be provided to one or more search term generators associated with the search term generator module 128. The search term generator(s) may then generate one or more search terms for the entity based on the selected contextual information. For example, if the contextual information was determined to be a street address, the search term generator(s) may offer search terms related to showing street maps of that location or querying the weather there. For a stock symbol, the generated search terms might include searching for a stock quote or financial information for the related company, etc.

As a practical example, consider an entity that is text. Filtered information that includes the text itself may be processed by a search term generator(s) associated with the search term generator module 128 to discover that the text describes a movie called "The Beach" (e.g., the text includes the movie's name, a description of the movie, names of actors in the movie, etc). In addition, the filtered information may also include information about the user's profile, namely that he/she resides in Phoenix, Ariz. Search terms such as "movie", "The Beach", "Phoenix", and "Arizona" may thus be generated that, when used for searching, are likely to provide search results that are contextually relevant to the entity, and thus to the user as well.

As another practical example, consider an entity that is a control, such as control button presented in an application or operating system window (e.g., WINDOWS CONTROL PANEL). Filtered information describing the name of the control button (e.g., "Network and Internet"), accessibility features of the control button, the window's name, the operating system type and/or version, etc. may be processed by a search term generator(s). As a result, search terms such as "Network and Internet", "WINDOWS CONTROL PANEL", and "help" may thus be generated. Since the user is most likely positioning the pointer over the "Network and Internet" control button because they are considering engaging this feature, such search terms are likely to provide search results that are contextually relevant to the entity and the user.

In some embodiments, individual search term generators may be manifest as plug-in extensions or other types of software functionality that may be provided by any type and number of sources. For example, one or more vendor-neutral search term generators not dedicated to a specific vendor or vendors may be provided, such as in a basic package (e.g., bundled with a pointing device and/or software, etc.) for instance. Alternatively or additionally, one or more proprietary vendor-specific search term generators may be provided. The search term generator module 128 may thus be thought of as providing a framework allowing for various vendor-neutral and/or vendor-specific search term generators (e.g., extensions) to be implemented (i.e., "plugged-into" the search term generator module). Allowing for such specialized proprietary knowledge via this type of framework may be advantageous with respect to providing relevant search terms that are meaningful to the user.

As one example of a type of plug-in extension, consider for instance an ADOBE extension that might be provided by ADOBE SYSTEMS. This extension, which might be downloaded and plugged into the search term generator module 128 for instance, may be specially configured to recognize an entity such as a .PDF file and/or other type of ADOBE-related file. Contextual information describing the entity as a .PDF file may facilitate the entity as being recognized as such. The ADOBE extension may also be configured to provide instructions for generating corresponding search terms for this file type(s).

Once search term(s) for the entity have been generated, the user experience module 130 can provide search functionality (in response to the activation) in any suitable way. In at least one embodiment, providing the search functionality includes enabling a search based at least in part on the generated search term(s). For example, a flyout window (e.g., a search ribbon, browser application window, etc.) may be presented on the display 116, allowing the user to initiate the search by engaging a control displayed on the flyout window, and/or by simply activating the search button on the SBE pointing device 120. Once the search is initiated, the results may be presented in the flyout window or in another flyout window. For example, if the user initiates the search from a flyout window that is not a browser application window, the search results may be presented in a browser application window.

Alternatively, in at least one embodiment providing the search functionality can include automatically initiating the search (based at least in part on the generated search term(s)) and then presenting the search results on the display 116 (e.g., in a flyout window). In some situations, providing the search functionality might require automatically initiating and conducting an external search using resources outside of the computing device 102 (e.g., from computing device 104 and/or one or more other computing devices via the network(s) 106). In such situations, a privacy opt-in and/or other measures may be taken to protect the user's anonymity and satisfy security/privacy requirements.

Example Computing Environments

Figure 2:
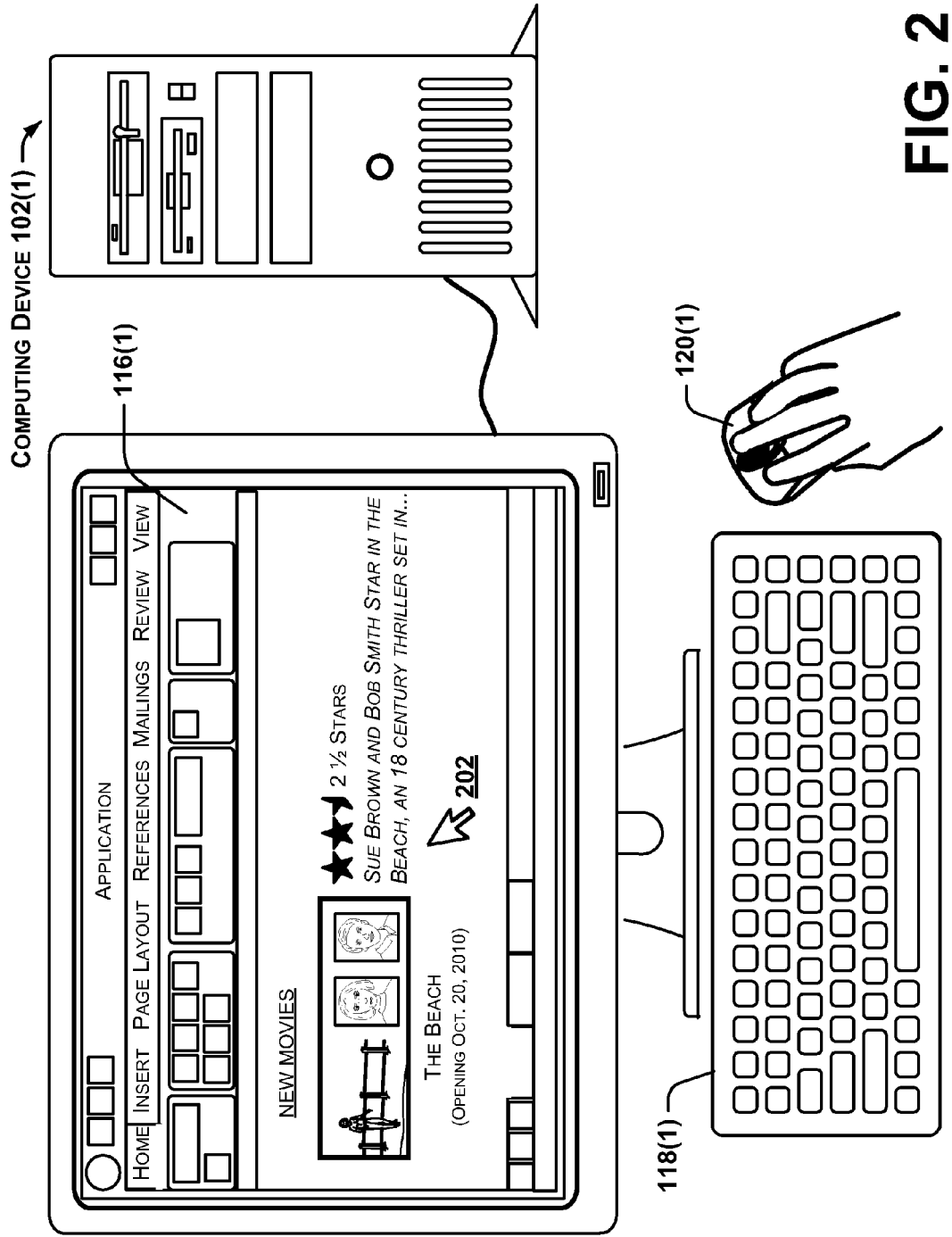
FIGS. 2-6 illustrate an example computing environment, in accordance with at least one embodiment.

To facilitate the reader's understanding of the described techniques, FIG. 2 illustrates an example computing environment 200 in which the described search techniques can be implemented. For purposes of discussion, the example computing environment 200 here is described in the context of the system 100. Like numerals from FIG. 1 have thus been utilized to depict like components. However, it is to be appreciated and understood that this is but one example and is not to be interpreted as limiting the system 100 to only being implemented in the example operating environment 200.

The computing device 102 is embodied in this example as a desktop computing device 102(1) that is associated with, and thus includes a display 116(1). However, this is not intended to be limiting and, as explained above, in other environments the computing device 102 may alternatively or additionally be embodied as any other type of suitable device(s). Similarly, the SBE pointing device 120 is shown in this example environment embodied as an SBE mouse 120(1). However, in other embodiments the SBE pointing device 120 may alternatively or additionally be embodied as any other type of human interface device (HID) configured as an SBE pointing device.

In this example, note that the SBE mouse 120(1) is shown as being manipulated by a user (via movement of the user's hand). Consequently, a pointer 202 that is being controlled (e.g., moved) by the user via the SBE mouse 120(1) is presented in the display 116(1). Also note that an application window is presented on the display 116(1). Along with various borders and controls associated with the application, text and images are also displayed. These text and images are associated with a movie entitled "The Beach".

Recall that an SBE pointing device, such as the SBE mouse 120(1), can be configured with a search button. Also recall that in at least one embodiment, this search button can be a dedicated search button on the SBE pointing device 120. Accordingly, consider the example scenario shown in FIG. 3 where the SBE mouse 120(1) is configured with a dedicated search button 302. Note that for the sake of simplicity, only the display 116(1) and SBE mouse 120(1) of the example computing environment 200 are shown.

Figure 3:
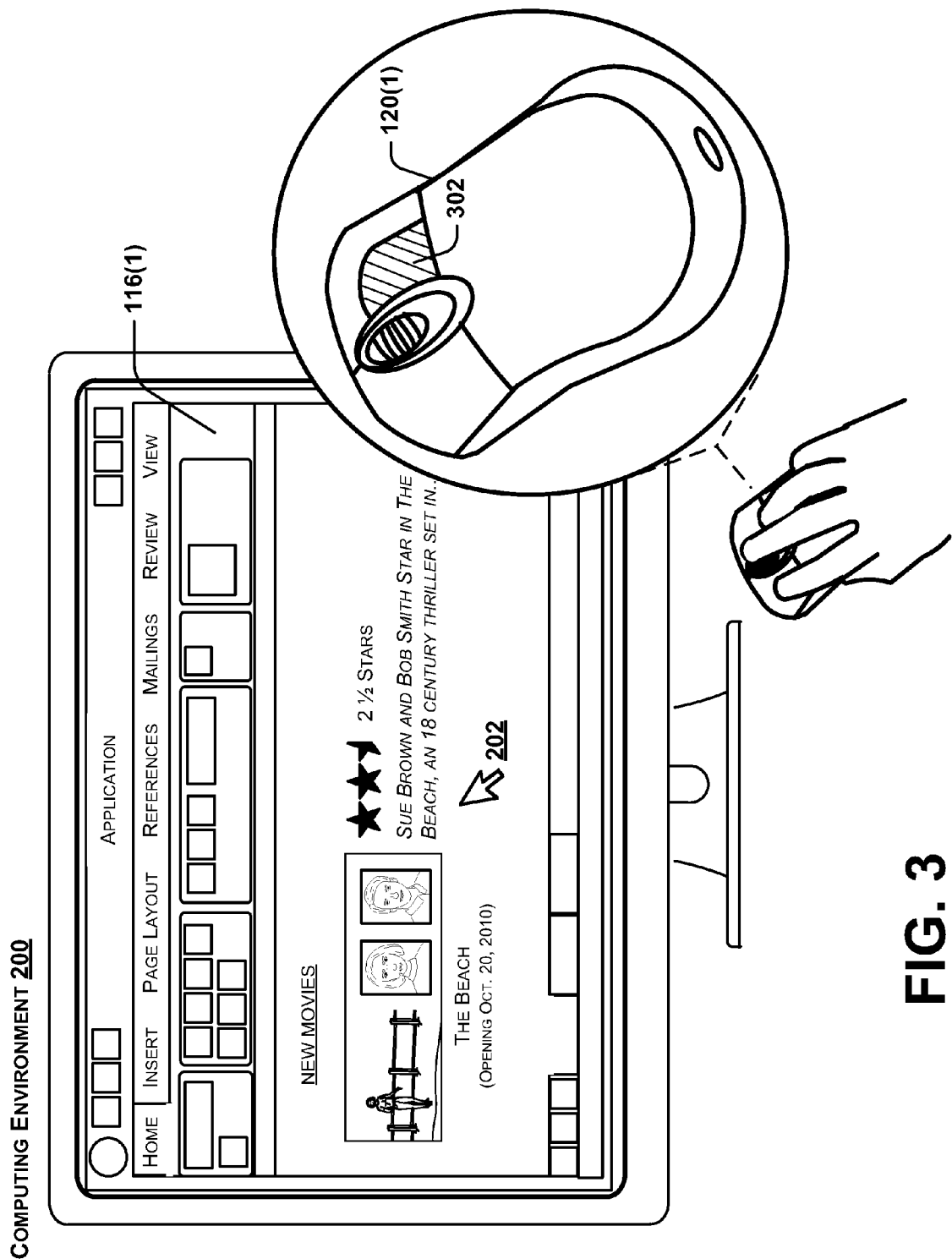

As shown in the example scenario of FIG. 3, the search button 302 has been integrated into the SBE mouse 120(1). While shown as a semi-oval shaped button near the top right position of the SBE mouse 120(1), it is to be appreciated and understood that the search button 302 can be of any shape and size, and can be positioned at any suitable location (or locations) on the SBE mouse 120(1).

Furthermore, it is to be appreciated and understood that the search button 302 can be designed in any suitable way, such as by being backlit, colored, translucent, labeled, etc. By way of example and not limitation, in at least one embodiment the search button 302 might be labeled with the name of a search service/engine (e.g., "BING", etc.), with a corresponding function (e.g., "Search", etc.), and/or with a particular symbol (e.g., trademarked symbol, etc.).

Figure 4:
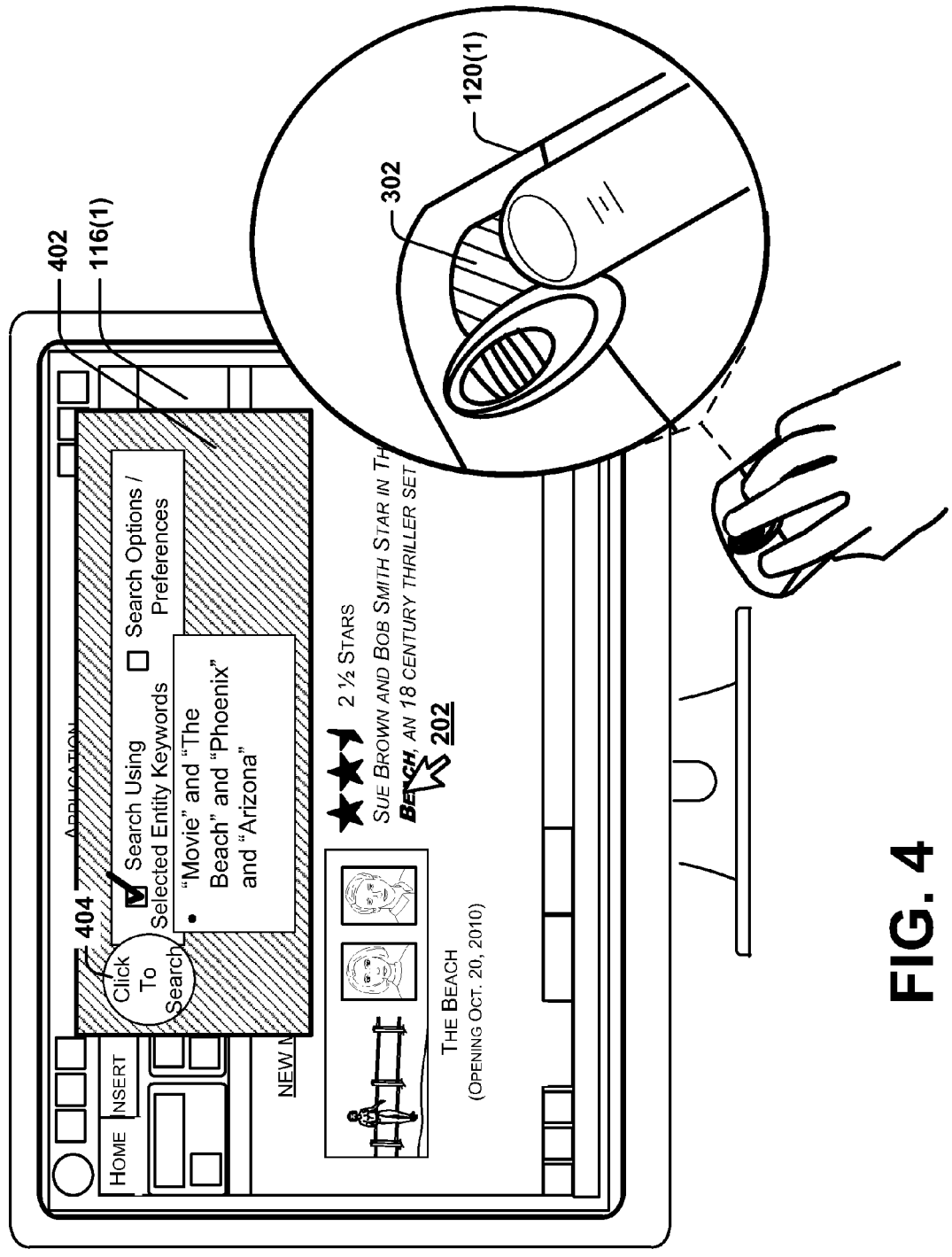

Assume that in this example scenario, the user lives in Phoenix, Ariz. (as indicated in the user's login profile for example) and is interested in seeing "The Beach". The user thus positions the pointer 202 to be located over part of the text describing "The Beach" (i.e., over the word "Beach") before activating the search button 302, as shown in FIG. 4. In this example, the text describing "The Beach" is an entity proximate the location of the pointer. Note that while the user did not highlight and select any text, in other scenarios the user might decide to highlight and select a text portion before activating the search button.

As a result of the user positioning the pointer and activating the search button 302, search functionality in the form of a flyout window 402 is provided. Note that the user is provided with the option of either initiating the search (i.e., by selecting a "Click to Search" control 404) solely based on the search terms, or selecting "Search Options/Preferences". "Search Options/Preferences" might include any suitable search-related options and/or preferences, such as without limitation: a text box for additional search terms, an option to change the existing search terms, content filtering preferences, search result preferences, etc.

As described above in detail, the flyout window 402 may have been provided by operations of the entity search module 122. More particularly, in this example scenario the activation detection module 124 may have detected the activation of the search button 302 and notified the information extraction module 126. In response, by virtue of the location of the pointer 202, the information extraction module 126 may have identified the text describing "The Beach" as an entity corresponding to the activation. Note that in this example, this text may or may not be associated with a navigable reference (e.g., hyperlink) pointing to a target.

The information extraction module 126 may have also obtained contextual information that is relevant to the identified entity and/or the computing experience associated with the activation. Here, this may have included words of the text, information about the user (e.g., from their login profile), etc. The information extraction module 126 may have then provided the search term generator module 128 with the contextual information. The search term generator module 128 may have selected some or all of the contextual information and provided the selected information to one or more search term generators to generate search term(s) relevant to the entity. Here in this example, these generated search terms include "Movie", "The Beach", "Phoenix", and "Arizona". The user experience module 130 may have then provided the flyout window 402 on the display 116(1).

Figure 5:
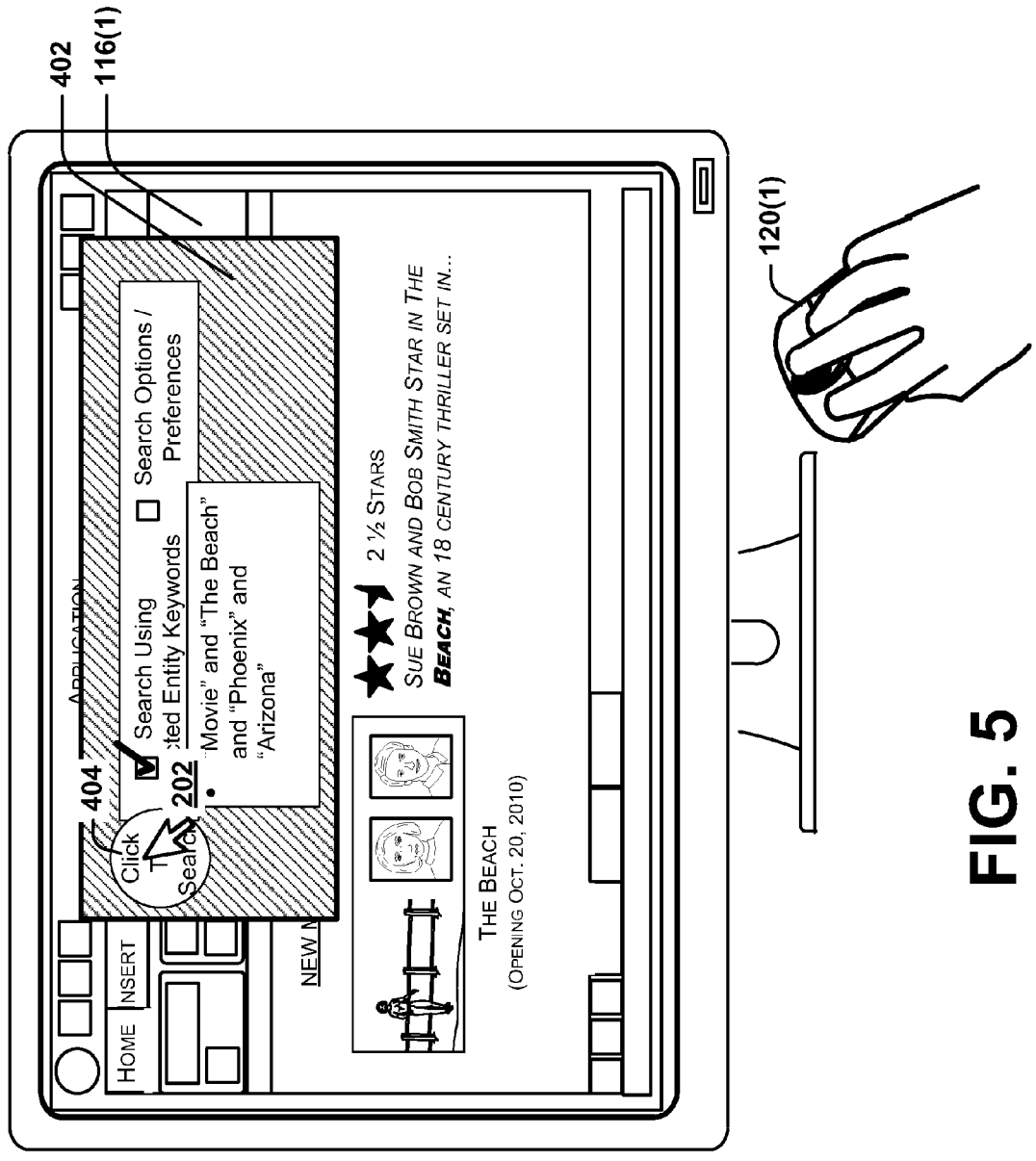
Figure 6:
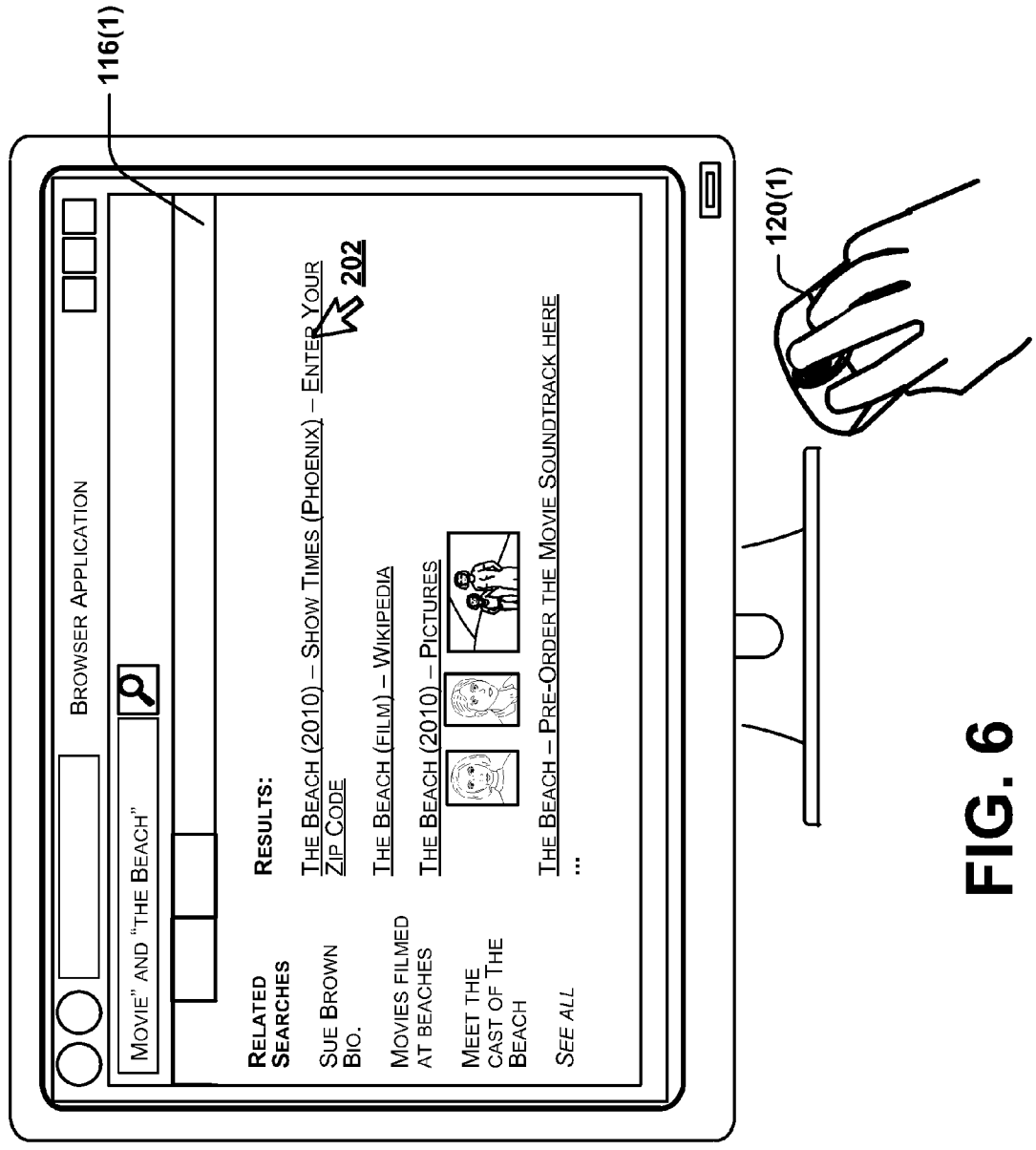

As shown in FIG. 5, now assume that in this example scenario the user wishes to initiate the search and thus positions the pointer over and clicks the "Click to Search" control 404. As shown in FIG. 6, as a result of the user doing this, a browser application window (e.g., the user's default web browser) is opened in the display 116(1). Note that the results of the search are presented in the browser application window. The user can then perform various additional searches or other types of activities associated with the search results. For example, in this scenario the user might select the "Enter Your Zip Code" result to find show times for The Beach in his/her zip code area.

Figure 7:
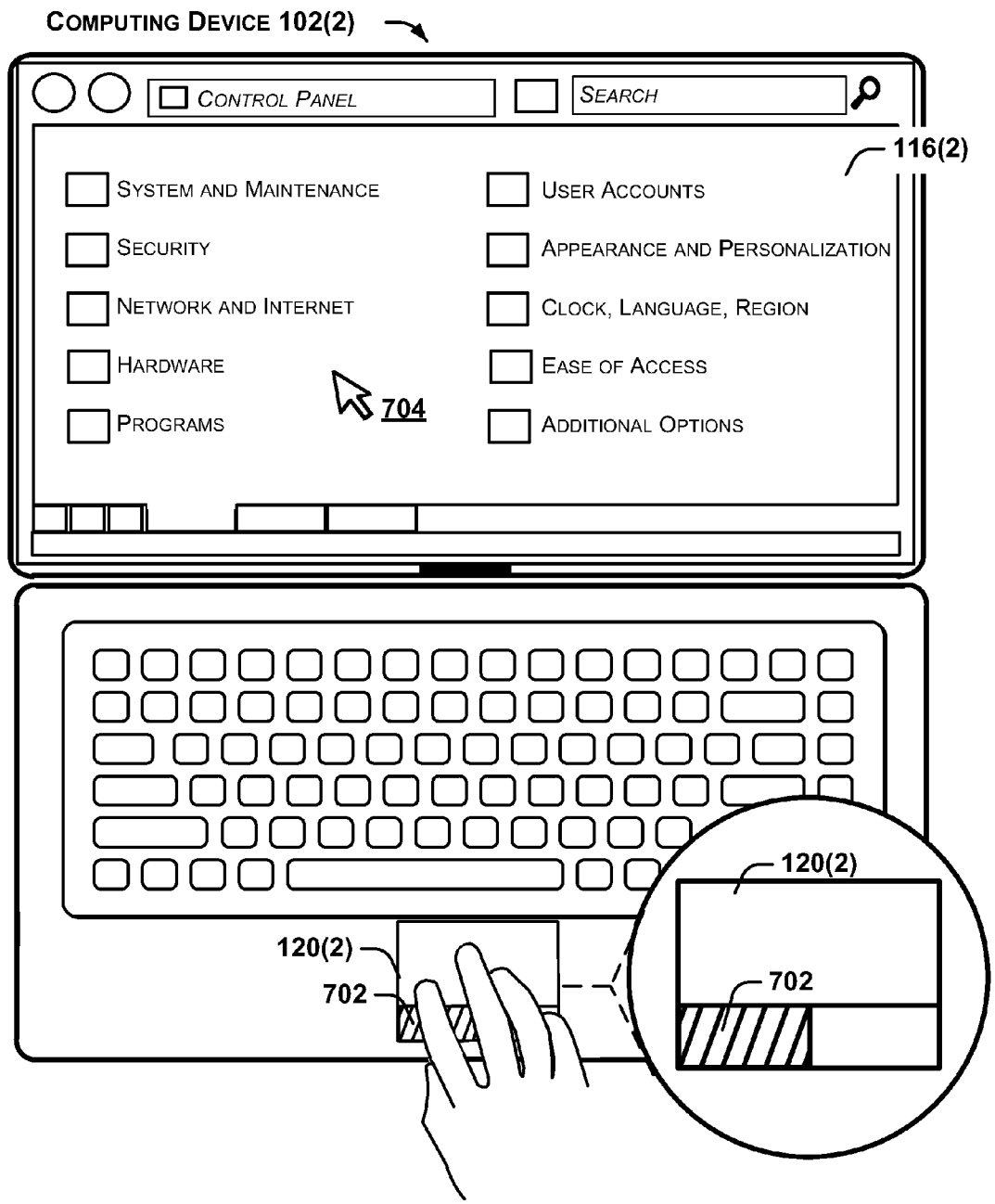
FIGS. 7-9 illustrate an example computing environment, in accordance with at least one embodiment.

FIG. 7 illustrates another example computing environment 700 in which the described search techniques can be implemented. For purposes of discussion, the example operating environment 700 is described in the context of the system 100. Like numerals from FIG. 1 have thus been utilized to depict like components. However, it is to be appreciated and understood that this is but one example and is not to be interpreted as limiting the system 100 to only being implemented in the example operating environment 700.

The computing device 102 is shown here embodied as a laptop computing device 102(2) that includes a display 116(2). However, this is not intended to be limiting and, as explained above, in other environments the computing device 102 can alternatively or additionally be embodied as any other type of suitable device(s).

Similarly, the SBE pointing device 120 is shown here embodied as an SBE track pad 120(2) of computing device 102(2). However, as also explained above, in other environments the SBE pointing device 120 may alternatively or additionally be embodied as any other type of HID configured as an SBE pointing device. Note that in this example, an existing activatable (e.g., depressible, tappable, etc.) button or portion of the SBE track pad 120(2) has been programmatically configured (e.g., by the user) as a search button 702.

In this example, the SBE pointing device 120(2) is shown as being manipulated by the user (e.g., via movement of the user's hand). Consequently, a pointer 704 is being controlled (e.g., moved) by the user via the SBE track pad 120(2). Also, note that a system control panel window has been opened on the display 116(2) and various configurable software and/or hardware controls are presented.

Figure 8:
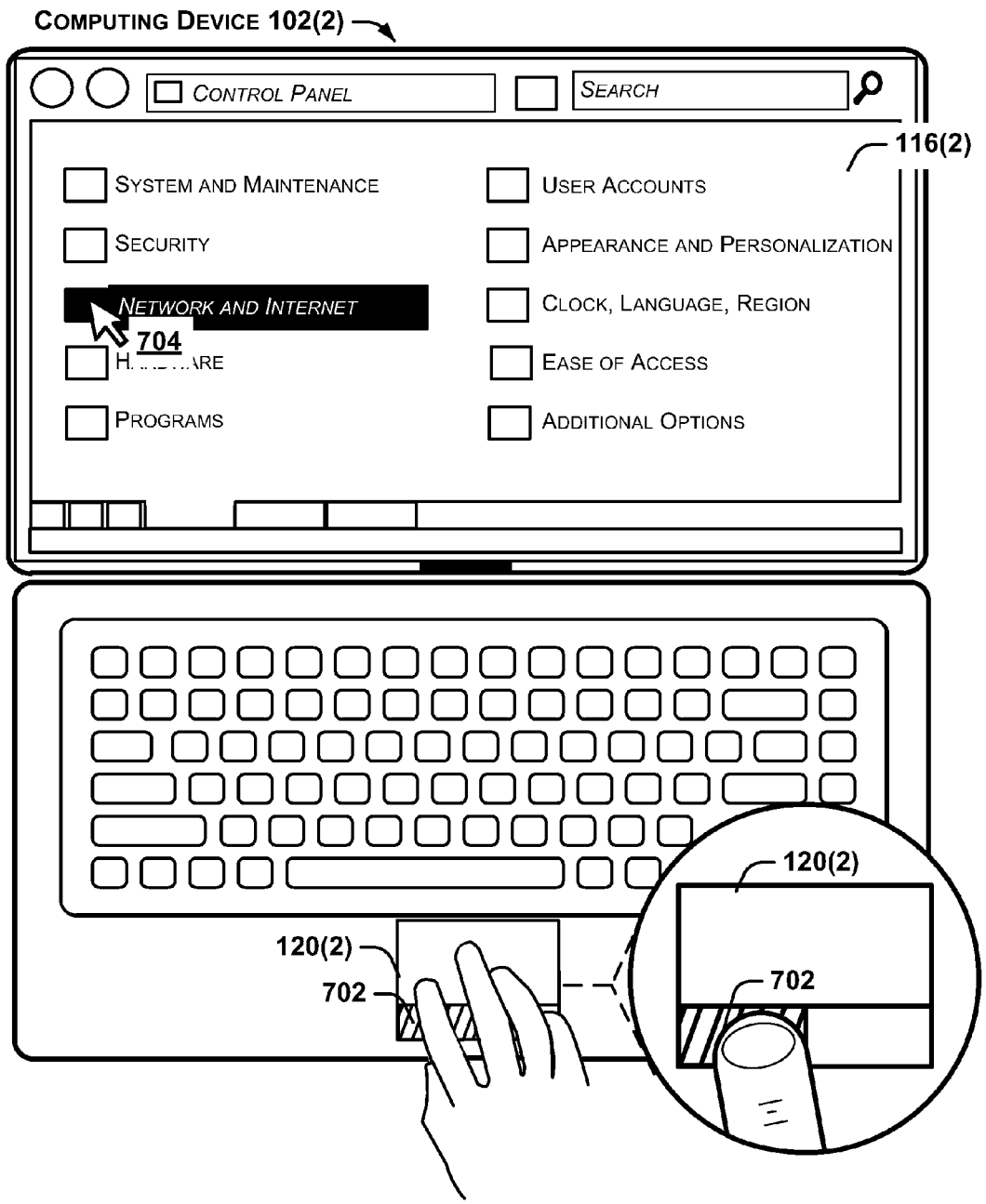

Now consider an example scenario where the user wishes to learn more about the "Network and Internet" control. As shown in FIG. 8, the user thus positions the pointer 704 over part of this control and then activates the search button 702. In this example, this control is thus an entity proximate the location of the pointer.

Figure 9:
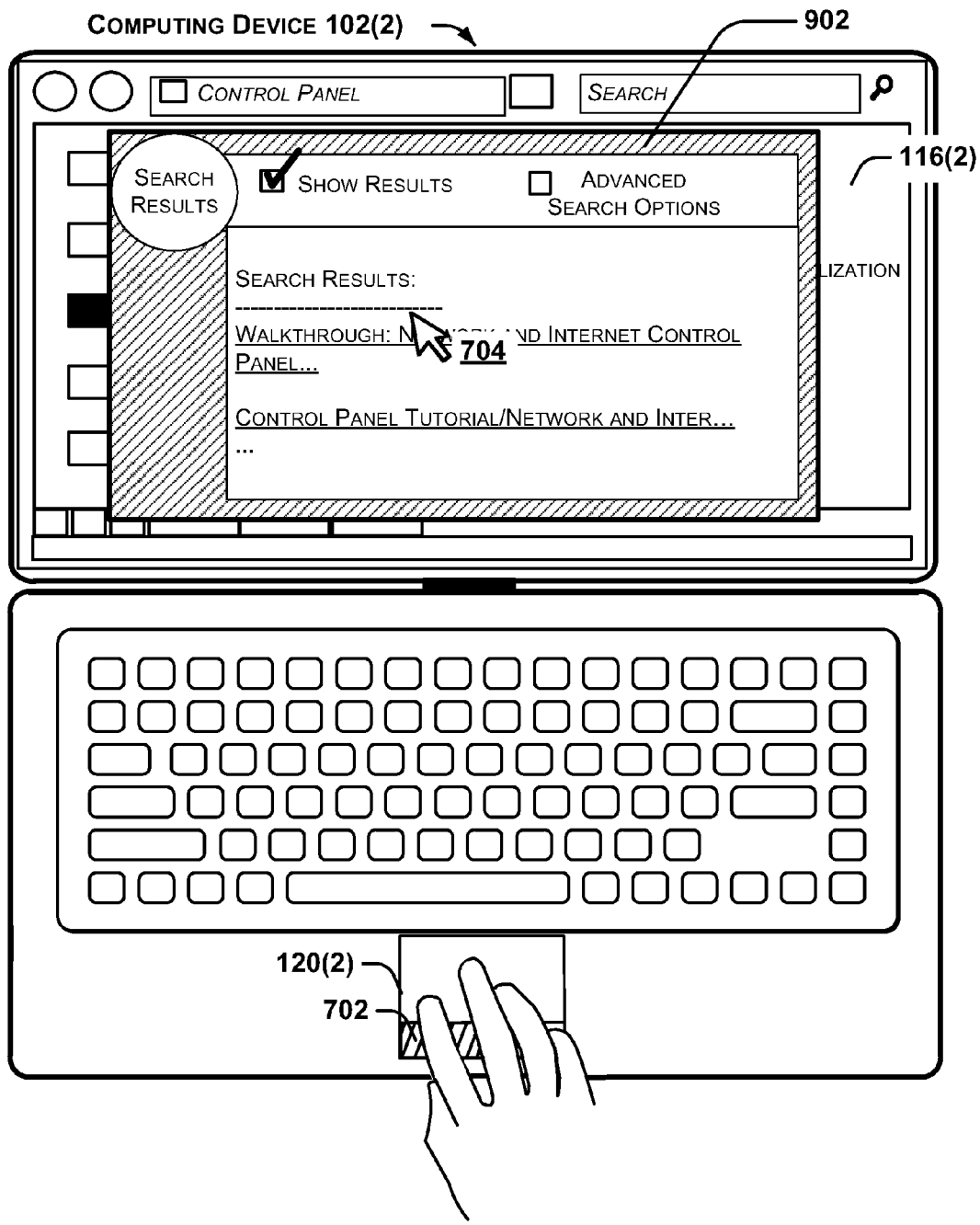

As shown in FIG. 9, as a result of the user positioning the pointer 704 proximate the "Network and Internet" control and then activating the search button 702, search functionality in the form of a flyout window 902 is provided. Unlike with the search functionality provided in flyout window 402 above however, here the search functionality is the result of a search that was automatically conducted in response to the search button 702 being activated. In other words, rather than presenting a flyout window allowing the user to initiate the search, the search was instead automatically initiated and the results automatically presented to the user in the flyout window 902.

As described above, in this example the flyout window 902 may have been provided by virtue of operations of the entity search module 122. More particularly, in this example scenario the activation detection module 124 may have detected the activation of the search button 702 and notified the information extraction module 126. In response, by virtue of the location of the pointer 704, the information extraction module 126 may have identified the control "Network and Internet" as an entity corresponding to the activation. Note that in this example, this control may or may not be associated with a navigable reference (e.g., a hyperlink) pointing to a target.

The information extraction module 126 may have also obtained contextual information that is relevant to the identified entity and/or the computing experience associated with the activation. Here, this information may have included the control's text (e.g., "Network and Internet"), accessibility information (e.g. "tool tip") for the control, the user's login identification, the fact that the control is presented in the WINDOWS Control Panel, the operating system type and/or version, etc. The search term generator module 128 may have analyzed the contextual information and provided the remaining filtered contextual information to one or more search term generators to generate search term(s) that are relevant to the entity. Here in this example, the search terms may have included "Microsoft" and "Vista" and "Control Panel" and "Network and Internet" for instance.

The user experience module 130 may have then automatically initiated a search (via the networks(s) 106 for example) and presented the search results in the flyout window 902. The user experience module 130 may have accomplished this in any suitable way. For example, without limitation, the user experience module 130 may have caused a search to be performed on one or more designated search servers. Alternatively or additionally, the user experience module 130 may have caused the search to be performed over the Internet. Consider, for instance, a scenario where the search is initially conducted on a designated server(s) and then, if the results were deemed insufficient, again over the Internet.

Example Method

Figure 10:
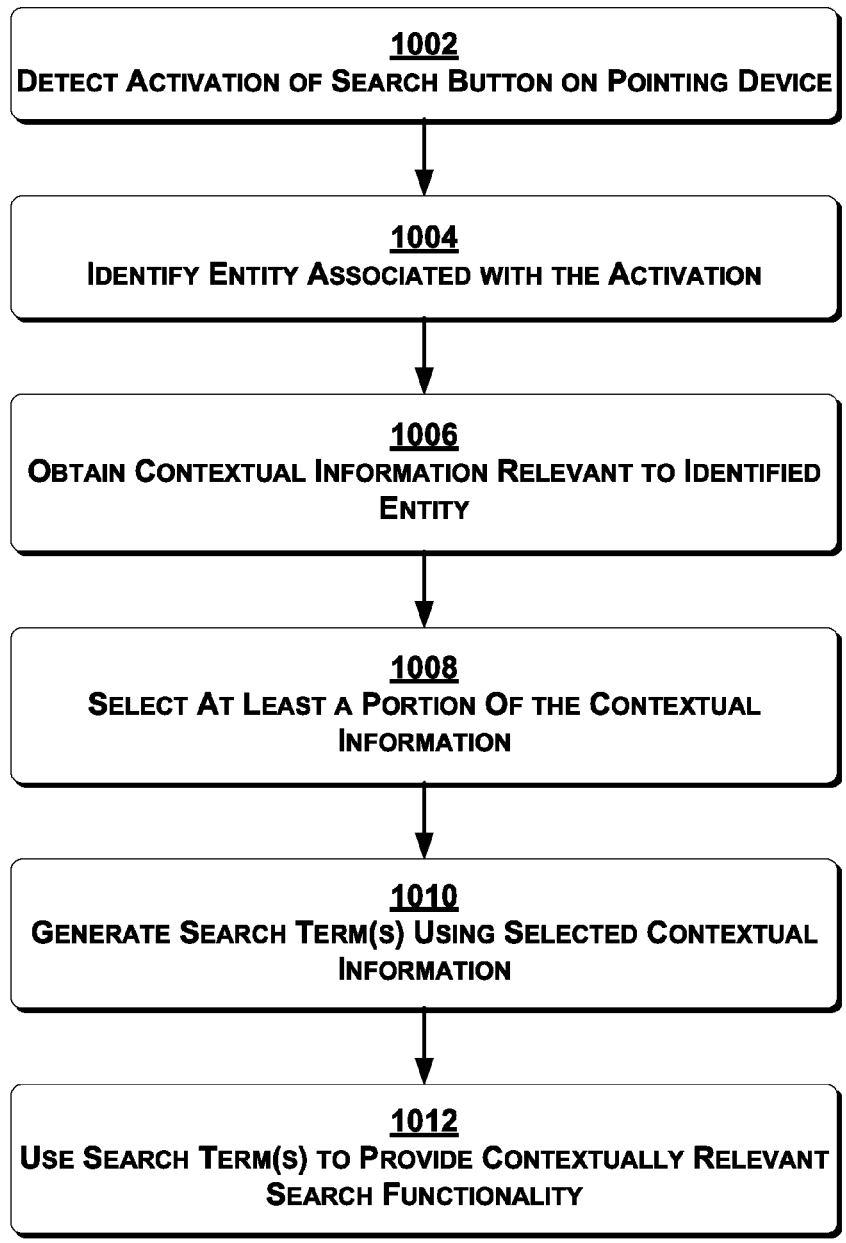
FIG. 10 illustrates an example method, in accordance with at least one embodiment.

FIG. 10 illustrates a flowchart of processes, techniques, or methods, generally denoted as a method 1000, that is consistent with some implementations of the described button-activated contextual search techniques.

For purposes of discussion, the method 1000 is described in the context of the system 100. Like numerals from FIG. 1 have thus been utilized to depict like components. However, it is to be appreciated and understood that this is but one example and is not to be interpreted as limiting this method to being implemented in the system 100.

Regarding the method 1000, at block 1002 an activation of a search button (e.g., the search button 302 or 702) on an SBE pointing device (e.g., the SBE pointing device 120) is detected. The SBE pointing device may correspond to a pointer (e.g., the pointer 202 or 704) and be configured to allow the pointer to be moved by the user to a location on a display (e.g., the display 116).

In operation, the activation can be detected in any suitable way. For example, recall that the activation detection module 124 described above may be configured with interface software (e.g., all or part of a mouse driver(s)) that allows an activation signal to be received from the SBE pointing device 120. The activation signal may be sent by the SBE pointing device 120 when the search button is activated.

At block 1004, an entity corresponding to the activation is identified in response to the activation being detected. For example, the identified entity may be located at or near the location of the pointer on the display. Recall that the entity may be any type of displayed entity, and need be not be associated with a navigable reference (e.g., hyperlink) pointing to a target, such as a document or element in a document that is a source/resource for the search for instance. Furthermore, the entity may be displayed in association with any type of window or other displayable functionality.

At block 1006, contextual information about (and thus relevant to) the identified entity and/or the computing experience associated with the activation is obtained. As described above in detail, the contextual information can be any type and amount of information. Furthermore, the contextual information can be obtained in any suitable way. For example, in least one embodiment the information extraction module 126 described above may be configured to obtain the information. Consider for instance an identified entity that is a file (e.g., a music file). The information extraction module 126 may process the file to extract metadata about the file. Alternatively or additionally, the information extraction module 126 may gather information about the computing experience associated with activation, such as the user's profile information, an application causing the entity to be displayed (e.g., a particular media player), etc.

At block 1008, at least a portion of the contextual information is selected. As explained above, the selected contextual information can then be used to generate one or more search terms for the identified entity. In operation, the selected contextual information can be selected in any suitable way. For example, recall that that in at least one embodiment the search term generator module 128 described above can filter out at least some of the contextual information that is not to be used for generating the search term(s).

At block 1010, the selected contextual information can be used to generate the search term(s). In operation, the search term(s) can be generated in any suitable way. For example, recall that in at least one embodiment the search term generator module 128 can provide the selected information to one or more search term generators. The search term generator(s) may then generate one or more search terms for the identified entity by processing the selected information.

As explained above, individual search term generators may be manifest as plug-in extensions or other types of software functionality that may be provided by any type of source, and by any number of sources, including third-party vendors for instance. The search term generator module 128 may thus be thought of as providing a framework allowing for various vendor-neutral and/or vendor-specific search term generators to be implemented.

At block 1012, in response to the activation, search functionality for the identified entity is provided on the display. The search functionality can be based on the generated search term(s), and thus be associated with, and contextually relevant to, that entity. In operation, the search functionality can be provided in any suitable way.

For example, recall that in at least one embodiment the user experience module 130 can automatically present a flyout window on the display in response to the activation. The flyout window may include (e.g., present) a control that allowing the user to initiate a search based on the generated search term(s) that is contextually relevant to the entity. Alternatively or additionally, the user may be able to initiate the search simply by activating the search button again. In addition, the flyout window may also present various search options and/or preferences that the user might select or deselect before initiating the search.

As another example, recall that in at least one embodiment, in response to the activation, the user experience module 130 can automatically initiate the search and then present results of the search in a flyout window.

It is to be appreciated and understood that the order in which the blocks shown in FIG. 10 have been described is not intended to be limiting, and the described blocks can be combined in any order to implement the method, or an alternate method. Further still, the method 1000 can be implemented in any suitable hardware, software, firmware, or combination thereof. In some embodiments, the method 1000 may be stored on a computer-readable storage media as a set of instructions such that, when executed by a computing device(s), cause the computing device(s) to perform the method(s).

CONCLUSION

Although methods, devices, systems, etc., pertaining to button-activated contextual search techniques are described in language specific to structural features and/or methodological acts, it is to be understood that the subject matter defined in the appended claims is not necessarily limited to the specific features or acts described. Rather, the specific features and acts are disclosed as exemplary forms for implementing the claimed methods, devices, systems, etc.

The invention claimed is:

1. A hardware computer-readable memory device or storage device having instructions stored thereon that, when executed by a computing device, cause the computing device to perform acts, the acts comprising:
    detecting an activation of a dedicated search button on a pointing device configured to move a pointer to a location on a display; and
    responsive to detecting the activation of the dedicated search button:
        identifying an entity proximate the location on the display and obtaining contextual information about a computing experience associated with the activation of the dedicated search button;
using at least a portion of the contextual information to generate one or more search terms for the entity;
automatically initiating a search using the one or more search terms without further user input; and
automatically providing search results on the display based on the one or more generated search terms for the entity.

2. The hardware computer-readable memory device or storage device of claim 1, wherein the activation comprises a single user click of the dedicated search button.

3. The hardware computer-readable memory device or storage device of claim 1, wherein the pointing device comprises a computer mouse device.

4. The hardware computer-readable memory device or storage device of claim 1, wherein the contextual information about the computing experience describes a computing environment at a time of the activation of the dedicated search button.

5. The hardware computer-readable memory device or storage device of claim 1, wherein the automatically provided search results are presented in a flyout window.

6. The hardware computer-readable memory device or storage device of claim 1, wherein the entity is not associated with a navigable reference.

7. A method comprising:
receiving an activation of a search control on a search button of a pointing device, the pointing device controlling a location of a pointer on a display;
responsive to receiving the activation, irrespective of a browser application being open, and irrespective of any program being open on the display, identifying:
an entity corresponding to the location of the pointer on the display, and
other displayed information that is not proximate the entity;
obtaining contextual information about the identified entity based at least in part on the other displayed information;
using the obtained contextual information to generate one or more search terms for the identified entity; and
providing search functionality on the display for the identified entity based on the one or more generated search terms,
wherein at least the identifying and the obtaining are performed by a computing device.

8. The method of claim 7, wherein the identified entity is not associated with a navigable reference and comprises text, a control, a file, or a displayed window.

9. The method of claim 7, further comprising utilizing one or both of a vendor-specific or vendor-neutral search term generator to generate the one or more search terms based on the obtained contextual information.

10. The method of claim 7, wherein providing the search functionality on the display comprises automatically presenting a flyout window on the display allowing a search to be initiated based on the one or more generated search terms.

11. The method of claim 7, wherein providing the search functionality on the display comprises automatically initiating a search based on the one or more generated search terms and automatically presenting results of the search in a flyout window without further user input.

12. The hardware computer-readable memory device or storage device of claim 1, wherein the contextual information comprises information about: an application associated with the display, the computing device, profile information associated with a user, and a date or time.

13. The method of claim 7, wherein the contextual information comprises information about: an application associated with the display, another computing device associated with the display, profile information associated with a user, and a date or time.

14. The method of claim 7, wherein the other displayed information comprises information displayed during the activation of the search button and other information displayed prior to the activation of the search button.

15. A hardware computer-readable memory device or storage device storing computer-readable instructions that, when executed by one or more processing devices, cause the one or more processing devices to perform acts comprising:
detecting an activation of a button on a pointing device, the pointing device controlling a location of a pointer on a display, the button configured to automatically initiate a search; and
responsive to detecting the activation of the button:
identifying an entity proximate the location on the display,
obtaining contextual information about a computing experience associated with the activation of the button,
using at least a portion of the contextual information to generate one or more search terms for the entity, and
automatically initiating the search using the one or more search terms without further user input.

16. The hardware computer-readable memory device or storage device of claim 15, wherein the obtaining the contextual information is based at least in part on other displayed information that is not proximate the entity.

17. The hardware computer-readable memory device or storage device of claim 15, wherein the contextual information describes a computing environment at a time of the activation of the button.

18. The hardware computer-readable memory device or storage device of claim 15, wherein the automatically initiating the search comprises causing search functionality to be provided on the display without a browser application being open and independent of any program open on the display.

19. The hardware computer-readable memory device or storage device of claim 15, wherein the activation comprises a single click of the button.

20. The hardware computer-readable memory device or storage device of claim 15, wherein the pointing device comprises a computer mouse device, a touch pad, or a track ball device.

21. A system, comprising:
an entity search module, including:
an activation detection module configured to detect an activation of a button on a pointing device, the pointing device controlling a location of a pointer on a display, the button configured to automatically initiate a search,
an information extraction module configured to:
identify an entity proximate the location on the display, and
obtain contextual information about a computing experience associated with the activation of the button, and
a search term generator module configured to use at least a portion of the contextual information to generate one or more search terms for the entity, wherein the entity search module is configured to automatically initiate the search using the one or more search terms without further user input; and a processing device that is configured to execute computer-executable instructions associated with the entity search module.

22. The system of claim 21, wherein the system includes the pointing device or the display.

23. The system of claim 21, wherein the system does not include the pointing device or the display.

* * * * *